(12) United States Patent
Serizawa

(10) Patent No.: US 11,018,342 B2
(45) Date of Patent: May 25, 2021

(54) BINDER COMPOSITION FOR SECONDARY BATTERY

(71) Applicant: NEC Corporation, Tokyo (JP)

(72) Inventor: Shin Serizawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/493,917

(22) PCT Filed: Mar. 14, 2018

(86) PCT No.: PCT/JP2018/009985
§ 371 (c)(1),
(2) Date: Sep. 13, 2019

(87) PCT Pub. No.: WO2018/168934
PCT Pub. Date: Sep. 20, 2018

(65) Prior Publication Data
US 2020/0028176 A1 Jan. 23, 2020

(30) Foreign Application Priority Data
Mar. 15, 2017 (JP) .............................. JP2017-049376

(51) Int. Cl.
| | | |
|---|---|---|
| *H01M 4/62* | (2006.01) | |
| *H01M 4/04* | (2006.01) | |
| *H01M 4/134* | (2010.01) | |
| *H01M 4/1395* | (2010.01) | |
| *H01M 4/38* | (2006.01) | |
| *H01M 4/525* | (2010.01) | |
| *H01M 10/0525* | (2010.01) | |
| *C08G 73/10* | (2006.01) | |

(52) U.S. Cl.
CPC .......... *H01M 4/622* (2013.01); *C08G 73/105* (2013.01); *C08G 73/1042* (2013.01); *H01M 4/0404* (2013.01); *H01M 4/134* (2013.01); *H01M 4/1395* (2013.01); *H01M 4/386* (2013.01); *H01M 4/525* (2013.01); *H01M 10/0525* (2013.01)

(58) Field of Classification Search
CPC . H01M 4/622; C08G 73/1042; C08G 73/105; C08G 79/08
See application file for complete search history.

(56) References Cited

U.S. PATENT DOCUMENTS

2013/0323587 A1* 12/2013 Kose .................. C08G 73/1071
429/211

FOREIGN PATENT DOCUMENTS

| JP | 2007-246680 A | 9/2007 |
|---|---|---|
| JP | 2011-048969 A | 3/2011 |
| JP | 2012-155934 A | 8/2012 |
| JP | 2013-089437 A | 5/2013 |
| JP | 2013-182807 A | 9/2013 |
| JP | 2015-065163 A | 4/2015 |
| JP | 2015-065164 A | 4/2015 |
| JP | 2016-027561 A | 2/2016 |
| JP | 6052528 B1 | 12/2016 |
| JP | 2018-060605 A | 4/2018 |
| WO | 2011/074439 A1 | 6/2011 |
| WO | 2014/196543 A1 | 12/2014 |

OTHER PUBLICATIONS

International Search Report for PCT/JP2018/009985 dated May 15, 2018 [PCT/ISA/210].

* cited by examiner

*Primary Examiner* — Ladan Mohaddes
(74) *Attorney, Agent, or Firm* — Sughrue Mion, PLLC

(57) ABSTRACT

A purpose of the present invention is to provide a binder composition for a secondary battery which improves the charge and discharge efficiency and the cycle characteristics of a battery. The binder composition for a secondary battery of the present invention is characterized by comprising a polyamide-imide comprising a repeating unit represented by chemical formula (1) or a precursor thereof, Chemical formula (1)

wherein A is a trivalent group obtained by removing carboxyl groups from a tricarboxylic acid, B is a divalent group obtained by removing amino groups from a diamine, and at least one of A and B is an aliphatic group.

9 Claims, 1 Drawing Sheet

BINDER COMPOSITION FOR SECONDARY BATTERY

CROSS REFERENCE TO RELATED APPLICATIONS

This application is a National Stage of International Application No. PCT/JP2018/009985, filed on Mar. 14, 2018, which claims priority from Japanese Patent Application No. 2017-049376, filed on Mar. 15, 2017, the contents of all of which are incorporated herein by reference in their entirety.

TECHNICAL FIELD

The present invention relates to a binder composition for a secondary battery and a secondary battery comprising this.

BACKGROUND ART

Lithium ion secondary batteries, which feature small size and large capacity, have been widely used as power supplies for electronic devices such as mobile phones and notebook computers and have contributed to enhancing convenience of mobile IT devices. In recent years, larger-scale applications, such as power supplies for driving automobiles and storage cells for smart grids, have attracted attention. As demand for lithium ion secondary batteries is increased and the batteries are used in more various fields, characteristics, such as higher battery energy density, lifetime characteristics which enable long term use and usability in a wide range of temperature conditions, are demanded.

Carbon materials are generally used in a negative electrode of the lithium ion secondary battery, but it has been studied to use silicon materials having large capability of absorbing and releasing lithium ions per unit volume in the negative electrode in order to enhance the energy density of the battery. However, there has been a problem in that the silicon materials expand and contract by repeating charge and discharge, causing breakage of the active material layer and peeling of active materials from the battery current collector, which deteriorate the cycle characteristics of the battery.

In order to solve this problem, polyamide-imide resin, which has high mechanical strength, is used as a binder in a negative electrode comprising the silicon material. Patent document 1 discloses that mechanical damage to electrode materials can be reduced by using a polyamide-imide prepared from an aromatic carboxylic acid derivative such as trimellitic anhydride and an aromatic diamine or an aromatic diisocyanate such as o-tolidine, o-tolidine diisocyanate, naphthalenethamine or naphthalene diisocyanate as a binder.

CITATION LIST

Patent Literature

Patent document 1: Japanese patent laid-open No. 2011-48969

SUMMARY OF INVENTION

Technical Problem

However, even for the battery described in the above mentioned prior art, which comprises the polyamide-imide prepared from an aromatic carboxylic acid derivative and an aromatic diamine (or an aromatic diisocyanate) as a binder, further improvement in charge and discharge efficiency and cycle characteristics has been desired. In view of the above problem, a purpose of the present invention is to provide a binder composition for a secondary battery which improves the charge and discharge efficiency and the cycle characteristics of a battery.

Solution to Problem

The first binder composition for a secondary battery of the present invention is characterized in comprising a polyamide-imide comprising a repeating unit represented by chemical formula (1) or a precursor thereof.

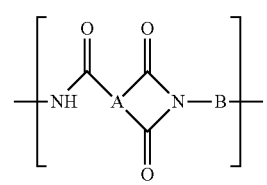

Chemical formula (1)

In chemical formula (1), A is a trivalent group obtained by removing carboxyl groups from a tricarboxylic acid, B is a divalent group obtained by removing amino groups from a diamine, and at least one of A and B is an aliphatic group.

Advantageous Effects of Invention

According to one embodiment of the present invention, it is possible to provide a binder composition for a secondary battery that improves the charge and discharge efficiency and the cycle characteristics of a battery.

Figure 1:
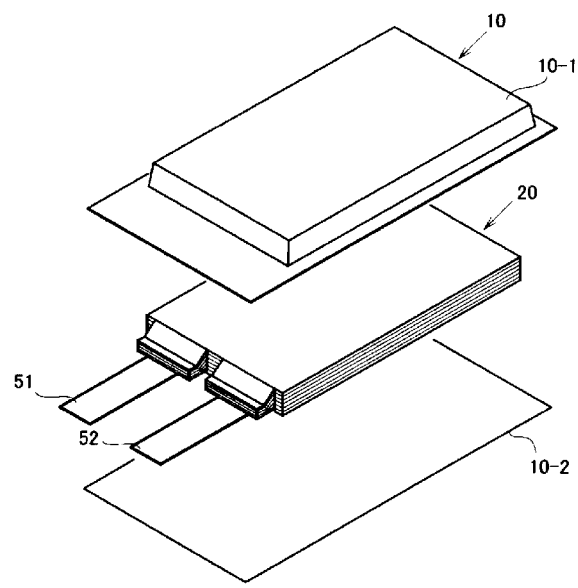
FIG. 1 is an exploded perspective view showing a basic structure of a film package battery.

DESCRIPTION OF EMBODIMENTS (1) Binder Composition for Secondary Battery

In the present embodiment, the binder composition for a secondary battery comprises a polyamide-imide or a precursor thereof. The binder composition for a secondary battery can be used as a binder in an electrode of a secondary battery. The binder composition for a secondary battery may further contain a solvent, an additive and the like.

The polyamide-imide comprises a repeating unit represented by the following chemical formula (1).

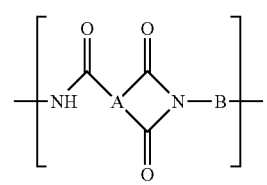

Chemical formula (1)

In chemical formula (1), A is a trivalent group obtained by removing carboxyl groups from a tricarboxylic acid, B is a divalent group obtained by removing amino groups from a diamine, and at least one of A and B is an aliphatic group.

The polyamide-imide precursor is a polymer that produces the above polyamide-imide by heat treatment. Examples of the polyamide-imide precursor include polyamic acids comprising a repeating unit represented by the following chemical formula (2).

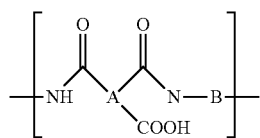

Chemical formula (2)

In chemical formula (2), A and B have the same meanings as in chemical formula (1).

These repeating units are determined by the structures of the tricarboxylic acid and the diamine that are the raw materials. Accordingly, such a repeating unit can also be represented in the form of "a repeating unit consisting of a skeleton based on a tricarboxylic acid and a skeleton based on a diamine" using raw material names.

The aliphatic group is not particularly limited, may be linear or branched, and may be saturated or unsaturated. The carbon number of the aliphatic group may be, for example, 1 to 27 or 2 to 18. The aliphatic group may comprise elements other than carbon and hydrogen, such as oxygen, sulfur and halogens.

The aliphatic group is preferably an alicyclic group, which has at least one ring. When the polymer main chain has rings, the binder may have high strength, improving cycle characteristics of a battery. The alicyclic group preferably comprises an aliphatic ring having 3 to 10 carbon atoms, more preferably an aliphatic ring having 5 to 7 carbon atoms. Examples of such aliphatic rings include cyclopropane, cyclobutane, cyclopentane, cyclohexane, cycloheptane and the like. The aliphatic ring may contain a double bond. Examples of such aliphatic rings include cyclopropene, cyclobutene, cyclopentene, cyclopentadiene, cyclohexene, cyclohexathene, cycloheptene, cycloheptathene and the like. Some or all of the hydrogen atoms on the aliphatic ring may be substituted with fluorine group, methyl group, methoxy group, trifluoromethyl group, trifluoromethoxy group or the like. In place of a methylene group (—CH$_2$—), a group such as —C(=O)— or —O— may be provided on the aliphatic ring. A group that cross-links the aliphatic ring may be provided. The alicyclic group may comprise a plurality of aliphatic rings, and may be a condensed polycyclic aliphatic group or a non-condensed polycyclic aliphatic group in which cycloaliphatic groups are linked to each other directly or via a crosslinking member (for example, —O—, —S—, —CH$_2$—, —C(CH$_3$)$_2$— or the like). Among these, alicyclic groups comprising a cyclohexane ring are especially preferred. Examples of such alicyclic groups include those comprising a cross-linked cyclohexane ring, such as norbornane. The aliphatic ring may directly bond to a carboxyl group (—COOH) and an amide group (—C(=O)NH—), and may bond to a carboxyl group (—COOH) and an amide group (—C(=O)NH—) via linkage groups such as alkylene groups having 1 to 5 carbon atoms, for example, methylene group and ethylene group.

When A is an alicyclic group, the alicyclic tricarboxylic acid for forming A is preferably represented by chemical formula (3).

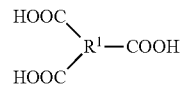

Chemical formula (3)

In chemical formula (3), R$^1$ represents a monocyclic aliphatic group, a condensed polycyclic aliphatic group, or a non-condensed polycyclic aliphatic group in which cycloaliphatic groups are linked to each other directly or via a crosslinking member.

Examples of the alicyclic tricarboxylic acid include cyclobutane tricarboxylic acid, cyclopentane tricarboxylic acid, cyclohexane tricarboxylic acid, norbornane tricarboxylic acid and the like.

The norbornane tricarboxylic acid preferably has a structure represented by the following chemical formula (4).

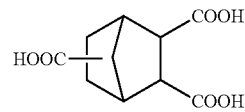

Chemical formula (4)

When A is a linear or branched aliphatic group, examples of the aliphatic tricarboxylic acid for forming A include tricarboxybutane, tricarboxypentane, tricarboxyhexane and the like. In these compounds, two carboxyl groups are preferably each on two carbons adjacent to each other.

When B is an alicyclic group, examples of the alicyclic diamine for forming B include cyclobutanediamine, cyclohexanediamine, bis(aminomethyl)cyclohexane, diaminobicycloheptane, diaminomethylbicycloheptane (including norbornanediamines such as norbornanediamine), diaminooxybicycloheptane, diaminomethyloxybicycloheptane (including oxanorbornanediamine), isophoronediamine, diaminotricyclodecane, diaminomethyltricyclodecane, bis(aminocyclohexyl)methane (or methylenebis(cyclohexylamine)), and bis(aminocyclohexyl)isopropylidene.

In one aspect, the alicyclic diamine may have a structure represented by chemical formula (5).

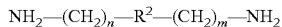

NH$_2$—(CH$_2$)$_n$—R$^2$—(CH$_2$)$_m$—NH$_2$  Chemical formula (5)

In chemical formula (5), R$^2$ represents an alicyclic group, and n and m each independently represent the number of repeating units selected from 1 to 5.

In chemical formula (5), n and m are preferably each independently 1 or 2 and most preferably 1. Although the reason is unclear, it is thought that the structure in which a linear hydrocarbon group such as methylene bonds to a ring improves the flexibility of the binder, making it possible for the binder to withstand the stress due to the active material expanding and contracting during cycles, and the structure also decreases the ability of forming a charge transfer complex and the ability of the diffusion of Li in the binder or between the binders, preventing the ring-opening of imide rings caused by Li being occluded and diffused into the binder.

In chemical formula (5), R$^2$ is preferably a monocyclic aliphatic group, a condensed polycyclic aliphatic group, or a non-condensed polycyclic aliphatic group in which cycloaliphatic groups are linked to each other directly or via a crosslinking member. The carbon number of $R^2$ is preferably 3 to 27, and more preferably 4 to 10. $R^2$ may have a substituent such as a hydrocarbon group such as methyl group or ethyl group, a halogen such as fluorine or chlorine, or the like. A heteroatom such as O or S may be present in part of the ring, and may be the crosslinking member or part of the crosslinking member.

Preferably, $R^2$ has a structure comprising a cyclohexane ring. Although the reason why this structure is preferable is not clear, it is thought that the cyclohexane structure makes it possible for the binder to withstand the stress due to the active material expanding and contracting during cycles, and the structure also decreases the ability of forming a charge transfer complex in the binder or between the binders, preventing the ring-opening of imide rings caused by Li being occluded and diffused into the binder.

Examples of the alicyclic diamine represented by chemical formula (5) include di(aminomethyl)cyclohexane, diaminomethylbicycloheptane (including norbornanediamines such as norbornanediamine), diaminomethyloxybicycloheptane (including oxanorbornanediamine), diaminomethyltricyclodecane, and the like.

Among these, compounds represented by the following chemical formula (5-1) or (5-2) are particularly preferred.

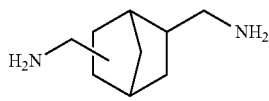

Chemical formula (5-1)

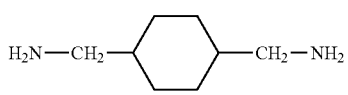

Chemical formula (5-2)

The position of the aminomethyl group of the norbornanediamine represented by chemical formula (5-1) is not particularly limited. For example, the norbornanediamine represented by chemical formula (5-1) may include structural isomers having different aminomethyl group positions, optical isomers including S and R-isomers, and the like. These may be contained in any ratio.

The 1,4-bismethylenecyclohexane skeleton in 1,4-bis(aminomethyl)cyclohexane represented by chemical formula (5-2) includes two kinds of geometric isomers (cis-isomer/trans-isomer). The trans-isomer is represented by the following chemical formula (X1) and the cis-isomer is represented by the following chemical formula (X2).

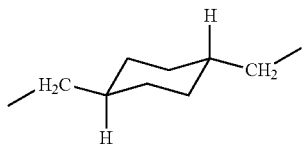

Chemical formula (X1)

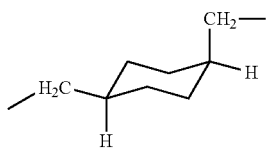

Chemical formula (X2)

The cis/trans ratio in chemical formula (5-2) is preferably 40/60 to 0/100 and more preferably 20/80 to 0/100. The glass transition temperature of the polyamide-imide comprising the diamine residue derived from chemical formula (5-2) is controlled by the cis/trans ratio, and as the ratio of the trans-isomer (X1) increases, the glass transition temperature of the polyamide-imide increases. The cis/trans ratio can be measured by nuclear magnetic resonance spectroscopy.

As the alicyclic diamine, one compound may be used alone, or a plurality of compounds may be used in combination. For example, only one skeleton based on the alicyclic diamine represented by chemical formula (5-1) or (5-2) may be contained, and two or more thereof may be contained.

When B is a linear or branched aliphatic group, examples of the aliphatic diamine for forming B include ethylene glycol diamines and alkylene diamines.

Examples of the ethylene glycol diamines include bis(aminomethyl)ether, bis(2-aminoethyl)ether, bis(3-aminopropyl)ether, bis[(2-aminomethoxy)ethyl]ether, bis[2-(2-aminoethoxy)ethyl]ether, bis[2-(3-aminopropoxy)ethyl]ether, 1,2-bis(aminomethoxy)ethane, 1,2-bis(2-aminoethoxy)ethane, 1,2-bis[2-(aminomethoxy)ethoxy]ethane, 1,2-bis[2-(2-aminoethoxy)ethoxy]ethane, ethylene glycol bis(3-aminopropyl)ether, diethylene glycol bis(3-aminopropyl)ether, and triethylene glycol bis(3-aminopropyl)ether.

Examples of the alkylene diamines include ethylene diamine, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, and 1,12-diaminododecane.

In the present embodiment, it is preferred that one of A and B in chemical formula (1) is an aromatic group. That is, the polyamide-imide preferably contains a repeating unit in which one of A and B is an aliphatic group and the other is an aromatic group. A polyamide-imide binder having such a repeating unit containing an aromatic group and an aliphatic group can improve battery characteristics.

The aromatic group preferably comprises an aromatic ring having 4 to 14 carbon atoms, more preferably an aromatic ring having 6 to 10 carbon atoms. Examples of such an aromatic ring include benzene, naphthalene, anthracene and the like. Among these, benzene is preferred. The aromatic group may comprises a plurality of these aromatic rings, and may be a condensed polycyclic aromatic group or a non-condensed polycyclic aromatic group in which aromatic groups are linked to each other directly or via a crosslinking member (for example, —O—, —S—, —CH$_2$—, —C(CH$_3$)$_2$— or the like). The carbon number of the aromatic group may be, for example, 4 to 27 or 6 to 20. Some or all of the hydrogen atoms on the aromatic ring may be substituted with a fluorine group, a methyl group, a methoxy group, a trifluoromethyl group, a trifluoromethoxy group or the like.

The aromatic ring may directly bond to a carboxyl group (—COOH) and an amide group (—C(=O)NH—), and may bond to a carboxyl group (—COOH) and an amide group (—C(=O)NH—) via linkage groups such as alkylene groups having 1 to 5 carbon atoms, for example, methylene group and ethylene group.

When A is an aromatic group, the aromatic tricarboxylic acid for forming A is preferably represented by chemical formula (6).

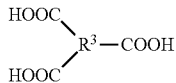

Chemical formula (6)

In chemical formula (6), $R^3$ represents a monocyclic aromatic group, a condensed polycyclic aromatic group, or a non-condensed polycyclic aromatic group in which aromatic groups are linked to each other directly or via a crosslinking member.

In chemical formula (6), $R^3$ is preferably a trivalent group having 4 to 27 carbon atoms. $R^3$ is preferably selected from the following groups.

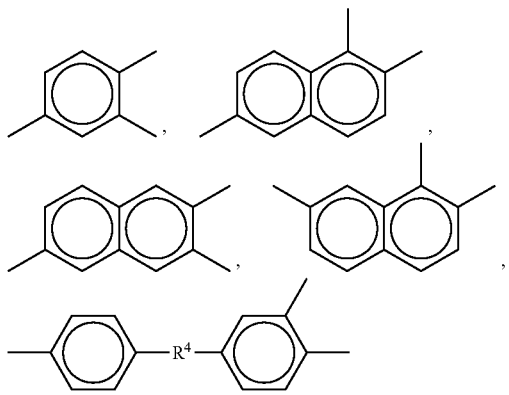

$R^4$ represents a single bond, an alkylene group having 1 to 5 carbon atoms, —O—, —S— or —C(=O)—.

Examples of the tricarboxylic acid comprising an aromatic represented by chemical formula (6) include trimellitic acid, 3',4,4'-biphenyltricarboxylic acid, 3',4,4'-diphenylmethanetricarboxylic acid, 3',4,4'-diphenylisopropanetricarboxylic acid, 3,4,4'-benzophenonetricarboxylic acid and the like.

When B is an aromatic group, examples of the aromatic diamine for forming B include:

<1> diamines having one benzene ring, such as p-phenylenediamine, m-phnylenediamine, p-xylylenediamine, and m-xylylenediamine;
<2> diamines having two benzene rings, such as 4,4'-diaminobipenyl (benzidine), 4,4'-diamino-2,2'-dimethylbiphenyl (m-tolidine), 4,4'-diamino-3,3'-dimethylbiphenyl (o-tolidine), 3,3'-diaminodiphenylether, 3,4'-diaminodiphenylether, 4,4'-diaminodiphenylether, 3,3'-diaminodiphenylsulfide, 3,4'-diaminodiphenylsulfide, 4,4'-diaminodiphenylsulfide, 3,3'-diaminodiphenylsulfone, 3,4'-diaminodiphenylsulfone, 4,4'-diaminodiphenylsulfone, 3,3'-diaminobenzophenone, 4,4'-diaminobenzophenone, 3,4'-diaminobenzophenone, 3,3'-diaminodiphenylmethane, 4,4'-diaminodiphenylmethane, 3,4'-diaminodiphenylmethane, 2,2-di(3-aminophenyl)propane, 2,2-di(4-aminophenyl)propane, 2-(3-aminophenyl)-2-(4-aminophenyl)propane, 2,2-di(3-aminophenyl)-1,1,1,3,3,3-hexafluoropropane, 2,2-di(4-aminophenyl)-1,1,1,3,3,3-hexafluoropropane, 2-(3-aminophenyl)-2-(4-aminophenyl)-1,1,1,3,3,3-hexafluoropropane, 1,1-di(3-aminophenyl)-1-phenylethane, 1,1-di(4-aminophenyl)-1-phenylethane, and 1-(3-aminophenyl)-1-(4-aminophenyl)-1-phenylethane;
<3> diamines having three benzene rings, such as 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(3-aminobenzoyl)benzene, 1,3-bis(4-aminobenzoyl)benzene, 1,4-bis(3-aminobenzoyl)benzene, 1,4-bis(4-aminobenzoyl)benzene, 1,3-bis(3-amino-α,α-dimethylbenzyl)benzene, 1,3-bis(4-amino-a,a-dimethylbenzyl)benzene, 1,4-bis(3-amino-α,α-dimethylbenzyl)benzene, 1,4-bis(4-amino-α,α-dimethylbenzyl)benzene, 1,3-bis(3-amino-α,α-ditrifluoromethylbenzyl)benzene, 1,3-bis(4-amino-α,α-ditrifluoromethylbenzyl)benzene, 1,4-bis(3-amino-α,α-ditrifluoromethylbenzylkenzene, 1,4-bis(4-amino-α,α-ditrifluoromethylbenzyl)benzene, 2,6-bis(3-aminophenoxy)benzonitrile, and 2,6-bis(3-aminophenoxy)pyridine;
<4> diamines having four benzene rings, such as 4,4'-bis(3-aminophenoxy)biphenyl, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 2,2-bis[4-(3-aminophenoxy)phenyl]propane, 2,2-bis[4-(4-aminophenoxy)phenyl]propane, 2,2-bis[3-(3-aminophenoxy)phenyl]-1,1,1,3,3,3-hexafluoropropane, and 2,2-bis[4-(4-aminophenoxy)phenyl]-1,1,1,3,3,3-hexafluoropropane;
<5> diamines having five benzene rings, such as 1,3-bis[4-(3-aminophenoxy)benzoyl]benzene, 1,3-bis[4-(4-aminophenoxy)benzoyl]benzene, 1,4-bis[4-(3-aminophenoxy)benzoyl]benzene, 1,4-bis[4-(4-aminophenoxy)benzoyl]benzene, 1,3-bis[4-(3-aminophenoxy)-α,α-dimethylbenzyl]benzene, 1,3-bis[4-(4-aminophenoxy)-α,α-dimethylbenzyl]benzene, 1,4-bis[4-(3-aminophenoxy)-α,α-dimethylbenzyl]benzene, and 1,4-bis[4-(4-aminophenoxy)-α,α-dimethylbenzyl]benzene; and
<6> diamines having six benzene rings, such as 4,4'-bis[4-(4-aminophenoxy)benzoyl]diphenylether, 4,4'-bis[4-(4-amino-α,α-dimethylbenzyl)phenoxy]benzophenone, 4,4'-bis[4-(4-amino-α,α-dimethylbenzyl)phenoxy]diphenylsulfone, and 4,4'-bis[4-(4-aminophenoxy)phenoxy]diphenylsulfone.

In addition, examples of the diamine with an aromatic substituent include 3,3'-diamino-4,4'-diphenoxybenzophenone, 3,3'-diamino-4,4'-dibiphenoxybenzophenone, 3,3'-diamino-4-phenoxybenzophenone, and 3,3'-diamino-4-biphenoxybenzophenone.

Aromatic diamines containing a fluorine group may be also used. Examples thereof include 2,2'-bis(trifluoromethyl)-4,4'-diaminobiphenyl, 2,3,5,6-tetrafluoro-1,4-diaminobenzene, 2,4,5,6-tetrafluoro-1,3-thaminobenzene, 2,3,5,6-tetrafluoro-1,4-benzene (dimethaneamine), 2,2'-difluoro-(1,1'-biphenyl)-4,4'-diamine, 2,2',6,6'-tetrafluoro-(1,1'-biphenyl)-4,4'-diamine, 4,4'-diaminooctafluorobiphenyl, 2,2-bis(4-aminophenyl)hexafluoropropane, 4,4'-oxybis(2,3,5,6-tetrafluoroaniline) and the like.

Several types of the polyamide-imides may be used in combination. For example, a polyamide-imide, comprising a repeating unit consisting of a skeleton based on an aromatic tricarboxylic acid and a skeleton based on an alicyclic diamine, or a precursor thereof and a polyamide-imide, comprising a repeating unit consisting of a skeleton based on an alicyclic tricarboxylic acid and a skeleton based on an aromatic diamine, or a precursor thereof may be used in combination. Also, the polyamide-imide and the precursor thereof may comprise both a repeating unit consisting of a skeleton based on an aromatic tricarboxylic acid and a skeleton based on an alicyclic diamine and a repeating unit consisting of a skeleton based on an alicyclic tricarboxylic acid and a skeleton based on an aromatic diamine.

In the polyamide-imide or the precursor thereof according to the present embodiment, the ratio of the number of the repeating units represented by chemical formula (1) or (2) to the total number of repeating units is preferably 50% or more, more preferably 80% or more, and may be 100%.

The polyamide-imide and the precursor thereof may comprise a repeating unit other than those described above. For example, the polyamide-imide and the precursor thereof may comprise a repeating unit consisting of a skeleton based on a tetracarboxylic acid or a dicarboxylic acid and a skeleton based on a diamine. Examples of the diamine include those described above.

Examples of the tetracarboxylic acid include aromatic tetracarboxylic acids such as pyromellitic acid, biphenyltetracarboxylic acid, benzophenonetetracarboxylic acid and biphenylethertetracarboxylic acid; alicyclic tetracarboxylic acids such as cyclobutanetetracarboxylic acid, cyclopentanetetracarboxylic acid, cyclohexanetetracarboxylic acid and cycloheptanetetracarboxylic acid; and aliphatic tetracarboxylic acids such as ethanetetracarboxylic acid, 1,2,3,4-butanetetracarboxylic acid and ethylenediaminetetraacetic acid.

Examples of the dicarboxylic acid include alicyclic dicarboxylic acids such as cyclohexanedicarboxylic acid, dicyclohexylmethanedicarboxylic acid and dimer acid; aromatic dicarboxylic acids such as terephthalic acid, isophthalic acid, diphenyl sulfonedicarboxylic acid, diphenyl ether dicarboxylic acid and naphthalenedicarboxylic acid; and aliphatic dicarboxylic acids such as oxalic acid, adipic acid, malonic acid, sebacic acid, azelaic acid and dodecanedicarboxylic acid.

The binder composition for a secondary battery of the present invention may comprise another polymer in addition to the above described polyamideimide and the precursor thereof. For example, the binder composition for a secondary battery may comprise a polyamide-imide or a precursor thereof consisting of repeating units consisting of a skeleton based on an aromatic tricarboxylic acid and a skeleton based on an aromatic diamine. Examples of the aromatic tricarboxylic acid and the aromatic diamine include those described above.

In the binder composition for a secondary battery, the amount of the polyamide-imide comprising the repeating unit represented by chemical formula (1) and the precursor thereof is preferably 50 mass % or more, more preferably 70 mass % or more, and may be 100 mass % of the total amount of polyamide-imides and precursors thereof.

The polyamide-imide and the precursor thereof may be prepared by reacting the tricarboxylic acid and the diamine in a solvent. A carboxyl group in the tricarboxylic acid may be substituted to a carboxylic acid derivative such as ester, acid anhydride or acid halide. Cyclic acid anhydrides in which two carboxyl groups in the tricarboxylic acid are condensed may be used. An amino group (—NH$_2$) in the diamine may be substituted to an isocyanato group (—N=C=O). When an isocyanate is used as a raw material, the reaction may be carried out in the presence of a catalyst for the reaction of an isocyanate and an active hydrogen compound, for example, tertiary amine, alkali metal compound, alkaline earth metal compound or the like. Examples of the solvent include polar solvents such as N,N'-dimethylacetamide, N-methyl-2-pyrrolidone, N,N'-dimethylformamide, γ-butyrolactone and the like.

The polyamide-imide and the precursor thereof may be prepared by reacting the tricarboxylic acid (which may be a tricarboxylic acid derivative) and the diamine (which may be a diisocyanate) in a solvent. When the number of moles of the diamine in the solvent is referred to as x and the number of moles of the tricarboxylic acid is referred to as y, y/x is preferably 0.9 to 1.1, more preferably 0.95 to 1.05, further preferably 0.97 to 1.03, and particularly preferably 0.99 to 1.01. By polymerizing the tricarboxylic acid and the diamine at such a ratio, the molecular weight (polymerization degree) of the polyamide-imide or the precursor thereof can be adjusted moderately.

There are no particular limitations on the polymerization procedure. First, for example, a vessel equipped with a stirrer and a nitrogen inlet tube is prepared. The vessel is purged with nitrogen and charged with a solvent. A diamine is then added such that the solid content concentration of the obtained polyamide-imide and the precursor thereof will be 50 mass % or less. The temperature is adjusted, and the mixture is dissolved by stirring. An equimolar amount of a tricarboxylic acid with respect to the diamine is added to the solution. The temperature is adjusted, and the mixture is stirred for about 1 to 50 hours. Then a polyamide-imide or a precursor thereof can be obtained.

The polyamide-imide and the precursor thereof prepared as above are provided in a solution state. The polyamide-imide and the precursor thereof may be used in the binder composition for a secondary battery after isolated, for example, by the method of pouring the solution into a poor solvent to obtain a precipitate thereof (which may be dissolved in a predetermined solvent again). Alternatively, the prepared solution may be used as it is or after simply diluted in the binder composition for a secondary battery. From the standpoint of productivity and cost, it is preferred to use the resulting solution as it is without isolation.

In addition to the polyamide-imide and the precursor thereof, the binder composition for a secondary battery may contain components used in the preparation of the polyamide-imide and the precursor thereof, such as the above described solvents and polymerization catalysts. A promoter for converting the polyamide-imide precursor, such as polyamic acid, to a polyamide-imide may be also contained. For example, aromatic compounds, imidazoles and pyridines may be used as the promotors. The promoter may be added to the reaction solution together with the raw materials before the polyamide-imide precursor is prepared. The promoter may be added to the reaction solution after the polyamide-imide precursor is prepared.

The aromatic compound preferably comprises an electron donating group and an organic acid group. The aromatic compound comprising an electron donating group and an organic acid group accelerates the dehydration ring closure reaction (imidization reaction) of a polyamic acid. Thereby, a polyamide-imide can be obtained from a polyamic acid even at low temperature. In addition, such aromatic compounds also have the effect of preventing cleavage of imide bond caused by the reaction of the carbonyl group in the polyamide-imide with lithium. The electron donating group preferably has a negative Hammett substituent constant when it is substituted at the para position of benzoic acid. Examples of the electron donating group include alkyl group, alkoxy group, amino group, hydroxyl group, mercapto group, alkylthio group, and the like. Among them, alkyl group and hydroxyl group are particularly preferred, and hydroxyl group is most preferred. When the electron donating group is alkyl group, alkoxy group or alkylthio group, the carbon number is preferably 1 to 5, more preferably 1 to 3, and further preferably 1. The number of the electron donating groups present in the aromatic compound may be one or more. Preferably, the number of the electron donating groups is one.

Examples of the organic acid group include carboxyl group, sulfo group, and phosphate group. Among them, carboxyl group is particularly preferred. The number of the organic acid groups present in the aromatic compound may be one or more, preferably one or two, and most preferably one. When the organic acid groups are present in the aromatic compound in excess, they react with the polyamic acid three dimensionally, causing gelation in some cases. To prevent this, it is preferable to set the number of the organic acid groups in the aromatic compound to two or less. When two or more of the organic acid groups are present in the aromatic compound, the organic acid groups are preferably substituted at positions away from each other, for example, in meta relation, para relation or the like in the case of benzene ring. It is possible to prevent the organic acid groups of the aromatic compound from undergoing intramolecular condensation by arranging the organic acid groups at positions away from each other.

Preferred aromatic compounds are those in which hydrogens of the aromatic ring(s) have been directly substituted with the electron donating group and the organic acid group. Examples of the aromatic ring skeleton include benzene, biphenyl, naphthalene and the like. Among them, benzene has a low molecular weight and is preferred for increasing the energy density of the battery.

Examples of the preferred aromatic compound include hydroxybenzoic acid, aminobenzoic acid, alkylbenzoic acid, mercaptobenzoic acid, alkoxybenzoic acid, alkylthiobenzoic acid, hydroxybiphenyl carboxylic acid, aminobiphenyl carboxylic acid, alkylbiphenyl carboxylic acid, mercaptobiphenyl carboxylic acid, alkoxybiphenyl carboxylic acid, alkylthiobiphenyl carboxylic acid, hydroxynaphthalenecarboxylic acid, aminonaphthalenecarboxylic acid, alkylnaphthalenecarboxylic acid, mercaptonaphthalenecarboxylic acid, alkoxynaphthalenecarboxylic acid, alkylthionaphthalenecarboxylic acid, and the like. The substitution positions of the electron donating group and the organic acid group in these compounds are not particularly limited, but the compounds substituted with the electron donating group and the organic acid group at positions away from each other are more preferred. When the skeleton of the aromatic compound is benzene, the compounds in which the electron donating group and the organic acid group are in meta relation or para relation, especially in para relation are preferred. When the skeleton of the aromatic compound is biphenyl, the compounds in which the electron donating group and the organic acid group are at 4,4' position, 3,4' position, or 3,3' position, especially at 4,4' position are preferred. When the skeleton of the aromatic compound is naphthalene, the compounds in which the electron donating group and the organic acid group are at 2,6 position, 2,7 position, or 2,4 position, especially at 2,6 position are preferred.

In the binder composition for a secondary battery, the aromatic compound is preferably contained in an amount of 60 mass % or less, more preferably 30 mass % or less, based on the mass of the polyamic acid. In addition, in the binder composition for a secondary battery, the aromatic compound is preferably contained in an amount of 0.01 mass % or more, more preferably 0.1 mass % or more, based on the mass of the polyamic acid. The polyamic acid is commercially available as a solution in some cases, but herein, the mass of the polyamic acid does not include the mass of components other than the polyamic acid, such as solvents.

More specifically, since the reactivity of the aromatic compound depends on the electron donating group and the organic acid group, the appropriate amount may differ for each aromatic compound. For example, in the binder composition for a secondary battery, the aromatic compound may be preferably contained in an amount of 20 mass % or less, more preferably 10 mass % or less, based on the mass of the polyamic acid. For example, in the binder composition for a secondary battery, the aromatic compound may be preferably contained in an amount of 6 mass % or less, more preferably 3 mass % or less, based on the mass of the polyamic acid. For example, in the binder composition for a secondary battery, the aromatic compound may be preferably contained in an amount of 0.5 mass % or more, more preferably 1.5 mass % or more, based on the mass of the polyamic acid.

As the imidazoles (compounds), compounds of the following chemical formula (7) are suitably exemplified.

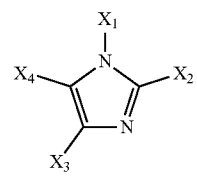

Chemical formula (7)

In chemical formula (7), $X_1$ to $X_4$ are each independently a hydrogen atom or an alkyl group having 1 to 5 carbon atoms.

Furthermore, among the imidazoles of chemical formula (7), an imidazole in which $X_1$ to $X_4$ are each independently a hydrogen atom or an alkyl group having 1 to 5 carbon atoms, and at least two of $X_1$ to $X_4$ are alkyl groups having 1 to 5 carbon atoms, namely, an imidazole having two or more alkyl groups as substituents, is more preferred.

The pyridine compound is a compound having a pyridine skeleton in the chemical structure, and preferable examples thereof include pyridine, 3-pyridinol, quinoline, isoquinoline, quinoxaline, 6-tert-butyl quinoline, acridine, 6-quinoline carboxylic acid, 3,4-lutidine, and pyridazine. These pyridine compounds may be used alone or in combination of two or more types thereof.

(2) Secondary Battery

A secondary battery can be produced using the binder composition for a secondary battery. The binder composition for a secondary battery can be used in either a negative electrode or a positive electrode forming a secondary battery, but an embodiment in which the binder composition for a secondary battery is used in a negative electrode will be described hereafter as one aspect.

<Negative Electrode>

The negative electrode comprises a negative electrode current collector and a negative electrode active material layer which is provided on the negative electrode current collector and comprises a negative electrode active material and a negative electrode binder, and optionally a conductive assisting agent. In the present embodiment, the above described binder composition for a secondary battery is used as the negative electrode binder. The negative electrode active material layer can be formed by mixing a negative electrode active material and the binder composition for a secondary battery, and optionally a conductive assisting agent and a solvent to prepare an electrode mixture paste for a secondary battery, and applying this to a negative electrode current collector.

Examples of the negative electrode active material include metals capable of alloying with lithium, metal oxides capable of absorbing and desorbing lithium ions, carbon materials capable of absorbing and desorbing lithium ions, and the like.

Examples of the metal include Li, Al, Si, Pb, Sn, In, Bi, Ag, Ba, Ca, Hg, Pd, Pt, Te, Zn, La, alloys of two or more of these and the like. Two or more of these metals and alloys may be mixed and used. These metals and alloys may comprise one or more non-metal elements.

Examples of the metal oxide include silicon oxide, aluminum oxide, tin oxide, indium oxide, zinc oxide, lithium oxide, and composites of these. In the present embodiment, tin oxide or silicon oxide is preferably contained as a negative electrode active material of the metal oxide, and silicon oxide is more preferably contained. This is because silicon oxide is relatively stable and is unlikely to trigger a reaction with other compounds. As silicon oxide, those represented by the composition formula $SiO_x$, ($0<x\geq2$) are preferred. Also, for example, 0.1 to 5 mass % of one or two or more elements selected from nitrogen, boron, and sulfur can be added to the metal oxide. In this way, the electro-conductivity of the metal oxide can be enhanced.

The surface of the metal capable of alloying with lithium or the metal oxide capable of absorbing and desorbing lithium ions may be coated with carbon. Since the carbon coating can suppress the reaction with an electrolyte solution or polyamic acid, an electrode having high capacity and good cycle characteristics can be produced thereby. Examples of a carbon coating method include known methods such as mixing with a carbon material by a ball mill, thermal decomposition or vapor deposition of a carbon source.

Examples of the carbon material include graphite, amorphous carbon, graphene, diamond-like carbon, carbon nanotube, and composites thereof. Here, highly crystalline graphite is highly electroconductive, and has excellent adhesion to a negative electrode current collector composed of a metal such as copper as well as voltage flatness. On the other hand, low-crystallinity amorphous carbon shows relatively small volume expansion, is thus highly effective in lessening the volume expansion of the entire negative electrode, and is unlikely to undergo degradation resulting from non-uniformity such as grain boundaries and defects.

In order to make use of the high mechanical strength of the binder composition for a secondary battery according to the present invention, it is preferable to use an active material which exhibits large expansion and contraction during charge and discharge among these negative electrode active materials. Examples of the active material which exhibits large expansion and contraction include Si alloys, Sn, silicon oxide, and tin oxide. In particular, silicon materials such as Si alloys and silicon oxide are preferred. This is because it is possible to make use of the advantage that the polyamide-imide binder can prevent an active material layer from being damaged and peeling off from the battery current collector because of the expansion and contraction. In addition, a lithium ion secondary battery excellent in energy density can be provided with these active materials. The amount of the silicon material is not particularly limited, and may be, for example, 10 mass % or more and may be 100 mass %, based on the total amount of the negative electrode active material.

In order to improve battery characteristics such as cycle characteristics, the electrode mixture paste for a secondary battery may contain the active materials which exhibit large expansion and contraction during charge and discharge in combination with other negative electrode active materials. For example, a Si alloy or a silicon oxide is preferably used in combination with a carbon material such as graphite. In addition, active material particles with carbon coating may be used to prevent damage to the active material caused by contact between the active material particles due to the expansion and contraction.

In the electrode mixture paste for a secondary battery, from the viewpoint of sufficient binding strength and high energy density being in a trade-off relation with each other, the amount of the polyamide-imide and the precursor thereof contained in the binder composition for a secondary battery is preferably 0.5 to 50 parts by mass, and more preferably 0.5 to 30 parts by mass, based on 100 parts by mass of the negative electrode active material to be used. Polyamide-imides and precursors thereof are commercially available as solutions in some cases, but the mass of the polyamide-imide and the precursor thereof here does not include the mass of components other than them, such as solvents.

Examples of the solvent contained in the electrode mixture paste for a secondary battery include conventional solvents used for polyamide-imide binders. Examples of a nonaqueous solvent include dimethylformamide, N-methylpyrrolidone, and the like. In addition, the solvent may comprise water.

For the electrode mixture paste for a secondary battery, a conductive assisting agent may be additionally mixed for the purpose of lowering the impedance. Examples of the conductive assisting agent include, flake-like, soot, and fibrous carbon fine particles and the like, for example, carbon black, acetylene black, ketjen black, vapor grown carbon fibers and the like.

The electrode mixture paste for a secondary battery can be prepared by mixing the above described components. Then the electrode mixture paste for a secondary battery is applied to the negative electrode current collector and dried, and thereby a negative electrode can be produced. Examples of a method of applying the electrode mixture paste for a secondary battery include a doctor blade method, a die coater method, a CVD method, a sputtering method, and the like.

As the negative electrode current collector on which the electrode mixture paste for a secondary battery is applied, from the view point of electrochemical stability, aluminum, nickel, copper, silver, tin, indium, magnesium, iron, chromium, molybdenum and alloys thereof are preferred. As the shape thereof, foil, flat plate, mesh and the like are exemplified.

After applying the electrode mixture paste for a secondary battery, if necessary, a heat treatment process may be provided to convert the polyamide-imide precursor such as polyamic acid to the polyamide-imide. The heat treatment temperature is preferably in the temperature range of 80 to 400° C., more preferably 120 to 380° C., and particularly preferably 150 to 350° C. When the electrode mixture paste for a secondary battery is applied to the current collector such as copper, the heat treatment may be conducted in the temperature range of 80 to 300° C., more preferably 120 to 280° C., and particularly preferably 150 to 250° C. In order to prevent foaming or powdering, the heat treatment may be conducted in a multi-stage manner. The heat treatment may be conducted under any atmosphere of air, an inert gas such as nitrogen, and vacuum. The time for the heat treatment depends on temperature and the amount of the electrode mixture paste for a secondary battery, but may be preferably 1 minute or more and 24 hours or less, and more preferably 5 minutes or more and 5 hours or less. Volatile components such as the solvent in the electrode mixture paste for a secondary battery may be removed in the heat treatment. The polymerization catalyst and promoter used for preparing the polyamide-imide and the precursor thereof may remain in the negative electrode active material layer. In addition, a dry process by heat or vacuum may be also provided before the heat treatment in order to remove the solvent in the electrode mixture paste for a secondary battery.

The polyamide-imide contained in the negative electrode may partially contain a repeating unit constituting a polyamide-imide precursor. In the polyamide-imide, the ratio (imidization rate) of the number of the polyamide-imide repeating units to the total number of the polyamide-imide precursor repeating units and the polyamide-imide repeating units is preferably 50% or more, more preferably 80% or more, and may be 100%. An electrode excellent in storage and cycle characteristics can be produced by adjusting the imidization rate within the above range. The imidization rate of the polyamide-imide precursor can be determined by $^1$H-NMR or FTIR.

From the viewpoint of increasing capacity, it is better that the content of the polyamide-imide and the precursor thereof in the negative electrode active material layer is low as long as the adhesive property is not impaired. The content of the polyamide-imide and the precursor thereof in the negative electrode active material layer is preferably 50 mass % or less, and more preferably 30 mass % or less. In order to obtain sufficient binding strength to the negative electrode active material, the content of the polyamide-imide and the precursor thereof in the negative electrode active material layer is preferably 0.5 mass % or more.

<Positive Electrode>

The positive electrode comprises a positive electrode current collector and a positive electrode active material layer which is provided on the positive electrode current collector and comprises a positive electrode active material and a positive electrode binder, and optionally a conductive assisting agent.

Examples of the positive electrode active material include lithium transition metal composite oxides. The positive electrode active material may be selected from several viewpoints. In terms of achieving high energy density, it is preferable to contain a high capacity compound. Examples of the high capacity compound include lithium nickelate (LiNiO$_2$) and lithium nickel composite oxides in which a part of Ni of lithium nickelate is replaced by another metal element, and layered lithium nickel composite oxides represented by the following formula (C) are preferred.

$$Li_yNi_{(1-x)}M_xO_2 \qquad (C)$$

wherein $0 \leq x \leq 1$, $0 < y \leq 1.2$, and M is at least one element selected from the group consisting of Co, Al, Mn, Fe, Ti, and B.

From the viewpoint of high capacity, it is preferred that the content of Ni is high, that is, x is less than 0.5, further preferably 0.4 or less in the formula (C). Examples of such compounds include $Li_\alpha Ni_\beta Co_\gamma Mn_\delta O_2$ ($0<\alpha\leq 1.2$, preferably $1\leq\alpha\leq 1.2$, $\beta+\gamma+\delta=1$, $\beta\geq 0.7$, and $\gamma\leq 0.2$) and $Li_\alpha Ni_\beta Co_\gamma Al_\delta O_2$ ($0<\alpha\leq 1.2$, preferably $1\leq\alpha 1.2$, $\beta+\gamma+\delta=1$, $\beta\geq 0.6$, preferably $\beta\geq 0.7$, and $\gamma\leq 0.2$) and particularly include $LiNi_\beta Co_\gamma Mn_\delta O_2$ ($0.75\leq\beta\leq 0.85$, $0.05\leq\gamma\leq 0.15$, and $0.10\leq\delta\leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (C). In addition, it is also preferred that particular transition metals do not exceed half. Examples of such compounds include $Li_\alpha Ni_\beta Co_\gamma Mn_\delta O_2$ ($0<\alpha\leq 1.2$, preferably $1\leq\alpha\leq 1.2$, $\beta+\gamma+\delta=1$, $0.2\leq\beta\geq 0.5$, $0.1\leq\gamma\leq 0.4$, and $0.1\leq\delta\leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (C) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (C)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ ($0<x<2$), $Li_2MnO_3$, $xLi_2MnO_3\cdot(1-x)LiMO_2$ ($0.1<x<0.8$, M is an element selected from the group consisting of Mn, Fe, Co, Ni, Ti, Al and Mg) and $Li_xMn_{1.5}Ni_{0.5}O_4$ ($0<x<2$); LiCoO$_2$ or materials in which a part of the transition metal in this material is replaced by other metal(s); materials in which Li is excessive as compared with the stoichiometric composition in these lithium transition metal oxides; materials having olivine structure such as LiFePO$_4$; and the like. In addition, materials in which these metal oxides are partially substituted by Al, Fe, P, Ti, Si, Pb, Sn, In, Bi, Ag, Ba, Ca, Hg, Pd, Pt, Te, Zn, La or the like are also usable. The positive electrode active materials described above may be used alone or in combination of two or more.

The positive electrode binder is not particularly limited, and polyvinylidene fluoride, vinylidene fluoride-hexafluoropropylene copolymer, vinylidene fluoride-tetrafluoroethylene copolymer, polytetrafluoroethylene, polypropylene, polyethylene, polybutadiene, polyacrylic acid, polyacrylic ester, polystyrene, polyacrylonitrile, polyimide, polyamide-imide and the like may be used. The binder composition for a secondary battery according to the present invention may be also used as the positive electrode binder. Also, the positive electrode binder may be a mixture, a copolymer or a cross-linked body of a plurality of the above resins, for example, styrene butadiene rubber (SBR). When an aqueous binder such as an SBR emulsion is used, a thickener such as carboxymethyl cellulose (CMC) can also be used. The lower limit of the amount of the positive electrode binder is preferably 1 part by mass or more, and more preferably 2 parts by mass or more, and the upper limit is preferably 30 parts by mass or less, and more preferably 25 parts by mass or less, based on 100 parts by mass of the positive electrode active material.

For the coating layer comprising the positive electrode active material, a conductive assisting agent may be added for the purpose of lowering the impedance. Examples of the conductive assisting agent include flake-like, soot, and fibrous carbon fine particles and the like, for example, graphite, carbon black, acetylene black, vapor grown carbon fibers and the like.

As the positive electrode current collector, from the viewpoint of electrochemical stability, aluminum, nickel, copper, silver, and alloys thereof are preferred. As the shape thereof, foil, flat plate, mesh and the like are exemplified. In particular, a current collector using aluminum, an aluminum alloy, or iron-nickel-chromium-molybdenum based stainless steel is preferable.

The positive electrode may be prepared by forming the positive electrode active material layer comprising the positive electrode active material and the binder on the positive electrode current collector. Examples of a method of forming the positive electrode active material layer include a doctor blade method, a die coater method, a CVD method, a sputtering method, and the like. After forming the positive electrode active material layer in advance, a thin film of aluminum, nickel or an alloy thereof as a positive electrode current collector may be formed thereon by a method such as vapor deposition or sputtering.

<Electrolyte Solution>

The electrolyte solution of the secondary battery according to the present embodiment is not particularly limited, but is preferably a non-aqueous electrolyte solution containing a non-aqueous solvent and a supporting salt which are stable to operation potentials of the battery.

Examples of the non-aqueous solvent include aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (MEC) and dipropyl carbonate (DPC); aliphatic carboxylic acid esters such as propylene carbonate derivatives, methyl formate, methyl acetate and ethyl propionate; ethers such as diethyl ether and ethyl propyl ether; phosphoric acid esters such as trimethyl phosphate, triethyl phosphate, tripropyl phosphate, trioctyl phosphate and triphenyl phosphate; fluorinated aprotic organic solvents obtainable by substituting at least a part of hydrogen atoms of these compounds with fluorine atom(s); and the like.

Among them, cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (MEC), dipropyl carbonate (DPC) or the like is preferably contained.

The non-aqueous solvents may be used alone, or in combination of two or more.

The supporting salt is not particularly limited except that it comprises Li. Examples of the supporting salt include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(FSO_2)_2$ (abbreviated as LiFSI), $LiN(CF_3SO_2)_2$, $LiN(C_2F_5SO_2)_2$, $LiB_{10}Cl_{10}$ and the like. Besides these, the supporting salt includes lower aliphatic lithium carboxylate, chloroboran lithium, lithium tetraphenylborate, LiBr, LiI, LiSCN, LiCl and the like. Among these, $LiPF_6$ and LiFSI are particularly preferred from the viewpoint of oxidation resistance, reduction resistance, stability and solubility. The supporting salts may be used alone or in combination of two or more. The amount of the supporting salt is preferably 0.4 mol or more and 1.5 mol or less, more preferably 0.5 mol or more and 1.2 mol or less with respect to 1 L of the non-aqueous solvent.

The electrolyte solution may further contain an additive. The additive is not particularly limited, and examples thereof include halogenated cyclic carbonates, unsaturated cyclic carbonates, cyclic or open-chain disulfonic acid esters, and the like. These compounds can improve battery characteristics such as cycle characteristics. This is presumably because these additives decompose during charge/discharge of the secondary battery to form a film on the surface of an electrode active material, which inhibits decomposition of the non-aqueous solvent and the supporting salt.

<Separator>

The separator may be of any type as long as it has durability against an electrolyte solution. Specific examples of a material include polyolefins such as polypropylene and polyethylene, cellulose, polyethylene terephthalate, polyimide, polyvinylidene fluoride, aromatic polyamides (aramid) such as polymetaphenylene isophthalamide, polyparaphenylene terephthalamide and copolyparaphenylene 3,4'-oxydiphenylene terephthalamide, and the like. These can be used as porous films, woven fabrics, nonwoven fabrics or the like.

<Insulation Layer>

An insulation layer may be formed on a surface of the positive electrode, the negative electrode and the separator. Examples of a method for forming the insulation layer include a doctor blade method, a die coater method, a CVD method, a sputtering method, and the like. The insulation layer may be formed at the same time as forming the positive electrode, negative electrode or separator. Materials constituting the insulation layer include a mixture of an insulating filler such as aluminum oxide or barium titanate and a binder such as SBR or polyvinylidene fluoride.

<Structure of Secondary Battery>

Figure 2:
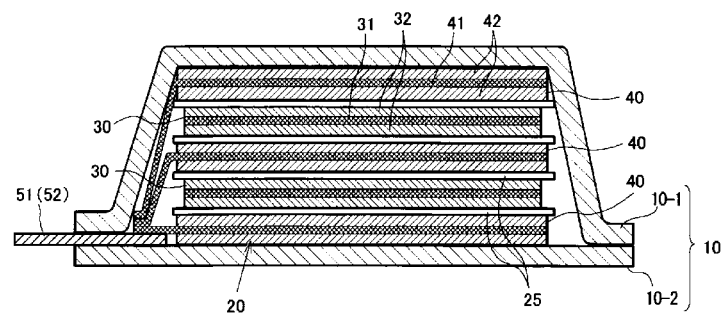
FIG. 2 is a cross-sectional view schematically showing a cross section of the battery of FIG. 1.

The secondary battery according to the present embodiment may have, for example, a structure as shown in FIGS. 1 and 2. This secondary battery comprises a battery element 20, a film outer package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

As shown in FIGS. 1 and 2, the secondary battery according to the present embodiment may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film outer package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film outer package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

<Method for Manufacturing Secondary Battery>

The secondary battery according to the present embodiment can be manufactured by a conventional method. An example of a method for manufacturing a secondary battery will be described taking a stacked laminate type secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the secondary battery.

<Assembled Battery>

A plurality of the secondary batteries according to the present embodiment may be combined to form an assembled battery. The assembled battery may be configured by connecting two or more secondary batteries according to the present embodiment in series or in parallel or in combination of both. The connection in series and/or parallel makes it possible to adjust the capacitance and voltage freely. The number of the secondary batteries included in the assembled battery can be set appropriately according to the battery capacity and output.

<Vehicle>

The secondary battery or the assembled battery according to the present embodiment can be used in vehicles. Vehicles according to the present embodiment include hybrid vehicles, fuel cell vehicles, electric vehicles (besides four-wheel vehicles (cars, commercial vehicles such as trucks and buses, light automobiles, etc.), two-wheeled vehicle (bike) and tricycle), and the like. The vehicles according to the present embodiment are not limited to automobiles, and it may be a variety of power source of other vehicles, such as a moving body like a train.

EXAMPLES

Production Example 1 of Binder Composition 39.6 g (0.2 mol) of cyclohexane tricarboxylic anhydride, 52.8 g (0.2 mol) of o-tolidine diisocyanate and 0.22 g of potassium fluoride were placed into a four-necked flask equipped with a stirrer, a thermometer, a nitrogen inlet tube and a cooling tube with an oil/water separator, and dissolved with 300 g of N-methyl-2-pyrrolidone. Subsequently, the mixture was made to react at 80° C. to 150° C. for 8 hours in a nitrogen stream with stirring, and then diluted with N-methyl-2-pyrrolidone to a solid content concentration of 15 mass % while cooling, and thereby a binder composition was obtained.

Production Example 2 of Binder Composition 15.8 g (0.08 mol) of cyclohexane tricarboxylic anhydride, 23 g (0.12 mol) of trimellitic anhydride, 52.8 g (0.2 mol) of o-tolidine diisocyanate and 0.30 g of triethylenediamine were placed into a four-necked flask equipped with a stirrer, a thermometer, a nitrogen inlet tube and a cooling tube with an oil/water separator, and dissolved with 300 g of N-methyl-2-pyrrolidone. Subsequently, the mixture was made to react at 80 to 150° C. for 8 hours in a nitrogen stream with stirring, and then diluted with N-methyl-2-pyrrolidone to a solid content concentration of 15 mass % while cooling, and thereby a binder composition was obtained.

Production Example 3 of Binder Composition

In a nitrogen stream, 60.59 g (0.306 mol) of 4,4'-thaminodiphenylmethane was placed into a four-necked flask equipped with a stirrer, a thermometer, a nitrogen inlet tube and a cooling tube with an oil/water separator, and dissolved with 193.26 g of N-methyl-2-pyrrolidone. Next, 68.25 g (0.300 mol) of norbornane tricarboxylic anhydride chloride was added while cooling so as not to exceed 20° C. After stirring at room temperature for 1 hour, 36.36 g (0.360 mol) of triethylamine was added while cooling so as not to exceed 20° C. The mixture was made to react at room temperature for 3 hours, and then diluted with N-methyl-2-pyrrolidone to a solid content concentration of 15 mass %. Thereby a binder composition was obtained.

Production Example 4 of Binder Composition

Into a four-necked flask equipped with a stirrer, a thermometer, a nitrogen inlet tube and a cooling tube with an oil/water separator, 38.33 g (0.2 mol) of trimellitic anhydride, 50.05 g (0.2 mol) of 4,4'-diphenylmethane diisocyanate and 0.116 g (0.002 mol) of potassium fluoride were placed together with N-methyl-2-pyrrolidone such that the solid content concentration would be 20%. The mixture was heated to 120° C. with stirring, made to react for about 3 hours, and then diluted with N-methyl-2-pyrrolidone to a solid content concentration of 15 mass % while cooling. Thereby a binder composition was obtained.

Example 1

Silicon monoxide having an average particle diameter D50 of 25 µm (made by Kojundo Chemical Laboratory Co., Ltd.) as a negative electrode active material, carbon black (3030B made by Mitsubishi Chemical Corporation), and the binder composition of Production example 1 were weighed at a mass ratio of 83:2:15 in terms of solid content concentration, and these were mixed with N-methyl-2-pyrrolidone to a solid content concentration of 43 mass % using a homogenizer to form a slurry. The slurry was applied to a 10 µm thick stainless steel foil using a doctor blade and heated at 120° C. for 10 minutes to remove N-methyl-2-pyrrolidone. Thereafter, it was heated stepwise at 200° C. for 1 hour and 250° C. for 1 hour under a nitrogen atmosphere using an inert oven manufactured by Koyo Thermo Systems Co., Ltd., to produce a negative electrode. A nickel negative electrode terminal for drawing electric charge was welded to the negative electrode.

Lithium cobalt oxide (made by Nichia Corpration) as a positive electrode active material, carbon black (3030B: made by Mitsubishi Chemical Corporation) and polyvinylidene fluoride (made by Kureha Corporation) were weighed at a mass ratio of 95:2:3, and these solid components and N-methyl-2-pyrrolidone were mixed at a mass ratio of 52:48 using a homogenizer to form slurry. The slurry was applied to a 15 μm thick aluminum foil using a doctor blade and heated at 120° C. for 5 minutes to remove N-methyl-2-pyrrolidone, and thereby a positive electrode was produced. An aluminum positive electrode terminal for drawing electric charge was welded to the positive electrode.

These were stacked via a separator to produce an electrode element. The produced electrode element was packaged with a laminate film, and an electrolyte solution was injected thereto. Subsequently, the laminate film was thermally fused and sealed while the pressure was reduced, and a flat plate type lithium ion secondary battery was fabricated. A polypropylene film was used as the separator, and an aluminum-deposited polypropylene film was used as the laminate film. A mixed solution of ethylene carbonate and diethylene carbonate at a volume ratio of 7:3, containing 1.0 mol/L of $LiPF_6$, was used as the electrolytic solution.

The resulting flat plate type lithium ion secondary battery was subjected to charge/discharge in the range from 4.2 V to 2.7 V under a 25° C. environment using a charge/discharge tester (ACD-100M: made by ASKA Electronics Co. Ltd.). The charge was performed in a CCCV mode in which the battery was charged at a constant current of 1 C up to 4.2V and at a constant voltage for 1 hour after voltage reached 4.2V. The discharge was performed in a CC mode in which the battery was discharged at a constant current of 1 C, and the initial discharge capacity was measured. As used herein, 1 C means a constant current value which is constantly released from a fully charged battery to finish discharge for 1 hour. In this way, 300 cycles of charge/discharge were performed, and the discharge capacity at the 300th cycle was measured. The ratio of the discharge capacity at the 300th cycle to the initial discharge capacity (300 dc/1 dc) was calculated. The result is shown in Table 1 together with the result of the initial charge/discharge efficiency (the ratio of the initial discharge capacity to the initial charge capacity).

Example 2

A flat plate type lithium ion secondary battery was fabricated and subjected to charge and discharge to determine the initial charge/discharge efficiency and 300 dc/1 dc in the same manner as in Example 1 except that the binder composition of Production example 2 was used instead of the binder composition of Production example 1. The results are shown in Table 1.

Example 3

A flat plate type lithium ion secondary battery was fabricated and subjected to charge and discharge to determine the initial charge/discharge efficiency and 300 dc/1 dc in the same manner as in Example 1 except that the binder composition of Production example 3 was used instead of the binder composition of Production example 1, and the heat treatment conditions after removal of N-methyl-2-pyrrolidone were changed to heating at 190° C. for 6 hours under a nitrogen atmosphere. The results are shown in Table 1.

Comparative Example 1

A flat plate type lithium ion secondary battery was fabricated and subjected to charge and discharge to determine the initial charge/discharge efficiency and 300 dc/1 dc in the same manner as in Example 1 except that the binder composition of Production example 4 was used instead of the binder composition of Production example 1. The results are shown in Table 1.

TABLE 1

| Binder composition | | Example 1 | Example 2 | Example 3 | Comparative example 4 |
|---|---|---|---|---|---|
| Tricarboxylic acid component (mol %) | Cyclohexane tricarboxylic anhydride | 100 | 40 | | |
| | Norbornane tricarboxylic anhydride chloride | | | 100 | |
| | Trimellitic anhydride | | 60 | | 100 |
| Diamine component (mol %) | Tolidine diisocyanate | 100 | 100 | | |
| | Diaminodiphenylmethane (or diphenylmethane diisocyanate) | | | 100 | 100 |
| Initial charge/discharge efficiency (%) | | 68 | 65 | 67 | 63 |
| 300 dc/1 dc (%) | | 52 | 47 | 74 | 25 |

These results suggest that initial charge/discharge efficiency and cycle characteristics can be improved by specifying the structures of the tricarboxylic acid component and the diamine component of a polyamide-imide.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The binder composition for a secondary battery and the secondary battery according to the present embodiment can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF SYMBOLS

10 film outer package
20 battery element
25 separator
30 positive electrode
40 negative electrode

The invention claimed is:

1. A binder composition for a secondary battery, the binder composition comprising:
a polyamide-imide consisting essentially of a repeating unit represented by formula (1) or a precursor thereof,

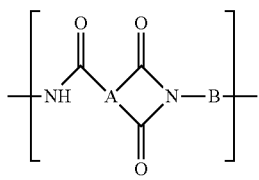

formula (1)

wherein, in formula (1), A is a trivalent group obtained by removing carboxyl groups from a tricarboxylic acid, B is a divalent group obtained by removing amino groups from a diamine, and at least one of A and B is an aliphatic group.

2. The binder composition for a secondary battery according to claim 1, wherein the aliphatic group comprises a ring.

3. The binder composition for a secondary battery according to claim 1, wherein the aliphatic group comprises a cyclohexane ring.

4. The binder composition for a secondary battery according to claim 1, wherein one of A and B is an aromatic group.

5. The binder composition for a secondary battery according to claim 1, wherein A is an alicyclic group, and B is an aromatic group.

6. The binder composition for a secondary battery according to claim 1, wherein the tricarboxylic acid is cyclohexane tricarboxylic acid or norbornane tricarboxylic acid.

7. A secondary battery comprising a negative electrode comprising the binder composition for a secondary battery of claim 1 and a silicon material.

8. The secondary battery according to claim 7, comprising a positive electrode comprising a lithium transition metal composite oxide.

9. A method for manufacturing an electrode for a secondary battery, the method comprising:
preparing an electrode mixture paste for the secondary battery by mixing:
a polyamide-imide consisting essentially of a repeating unit represented by formula (1) or a precursor thereof,
an active material, and
a solvent, and applying the electrode mixture paste for a secondary battery to a current collector,

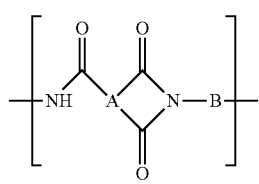

formula (1)

wherein, in formula (1), A is a trivalent group obtained by removing carboxyl groups from a tricarboxylic acid, B is a divalent group obtained by removing amino groups from a diamine, and at least one of A and B is an aliphatic group.

* * * * *